Jan. 23, 1923.

Re. 15,530

R. L. ATWELL.
TRAFFIC SIGNAL FOR VEHICLES.
ORIGINAL FILED AUG. 31, 1920.

3 SHEETS-SHEET 1

Inventor
R. L. Atwell

By Semmes & Semmes
Attorneys

Jan. 23, 1923.

Re. 15,530

R. L. ATWELL.
TRAFFIC SIGNAL FOR VEHICLES.
ORIGINAL FILED AUG. 31, 1920.

3 SHEETS-SHEET 2

Inventor
R. L. Atwell
By Semmes & Semmes
Attorneys

Jan. 23, 1923. Re. 15,530
R. E. ATWELL.
TRAFFIC SIGNAL FOR VEHICLES.
ORIGINAL FILED AUG. 31, 1920.
3 SHEETS-SHEET 3
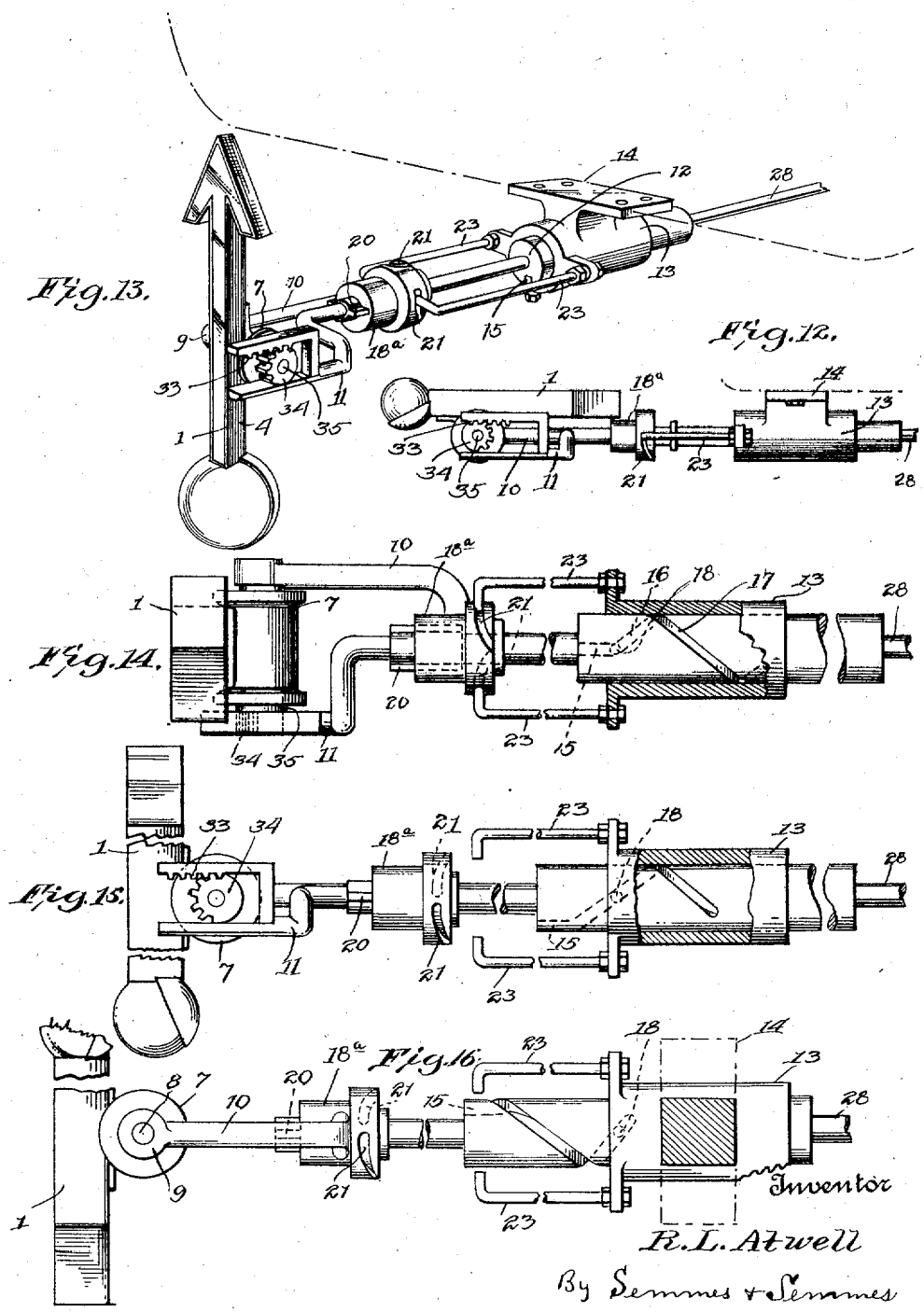
Inventor
R. L. Atwell
By Semmes & Semmes
Attorneys Reissued Jan. 23, 1923. Re. 15,530

UNITED STATES PATENT OFFICE.

ROBERT L. ATWELL, OF CHARLOTTE, NORTH CAROLINA.

TRAFFIC SIGNAL FOR VEHICLES.

Original No. 1,351,605, dated August 31, 1920, Serial No. 299,419, filed May 24, 1919. Application for reissue filed August 29, 1922. Serial No. 585,053.

*To all whom it may concern:*

Be it known that I, ROBERT L. ATWELL, a citizen of the United States, residing at Charlotte, North Carolina, have invented new and useful Improvements in Traffic Signals for Vehicles, of which the following is a specification.

This invention relates to traffic signals and especially signals which are adapted to be mounted upon an automobile, motor truck or other motor propelled vehicle and by means of which the operators of other cars as well as traffic policemen and pedestrians may be advised as to any change in the direction of the vehicle contemplated by the operator thereof without the necessity of the operator extending his arm for that purpose, thereby enabling him to use both arms and hands in the control of the machine.

One of the objects of my invention is to provide a signal or direction indicator which will point the direction in which the car is to move, which signal is adapted to be illuminated after nightfall so that it may be used as well at that time as during the daytime.

Another object of my invention is to provide a direction indicator which may also be used to illuminate the license plate and as a tail light for the vehicle, thus obviating the necessity of additional lights for that purpose.

A further object of my invention is to provide a signal with means for swinging it in more than two directions. The usual traffic signal is adapted to change its position in two directions only but in order to more thoroughly arouse the attention of the driver of the following or other nearby car and fix his attention upon the signal, I have so constructed it that it may be moved successively first in a horizontal plane in the line of travel of the vehicle; secondly from said horizontal plane to a vertical plane and thirdly, while occupying said vertical plane, it may be further moved to the right or to the left in a plane transverse to the direction of the movement of the vehicle.

A still further object in view is to provide a traffic signal the several parts of which may be readily applied to any machine either at the time of manufacture thereof or at any time subsequent thereto.

With the above and other objects in view, the invention consists in the novel construction, combination and arrangement of parts herein fully described, illustrated and claimed.

In the accompanying drawings:—

Fig. 12 is a side elevation of the device as it appears in its normal inactive position.

Fig. 13 is a perspective view of the device as it appears after its initial period of activation.

Fig. 14 is a plan view thereof as it appears after its initial period of activation.

Fig. 15 is a plan view of the device after the second period of activation has taken place and the signal has progressed 90 degrees from the vertical to indicate an intended movement of the vertical to the left, and Fig. 16 is a plan view of the device after the signal has progressed 180 degrees further to indicate an intended movement of the vertical to the right.

Figure 1:
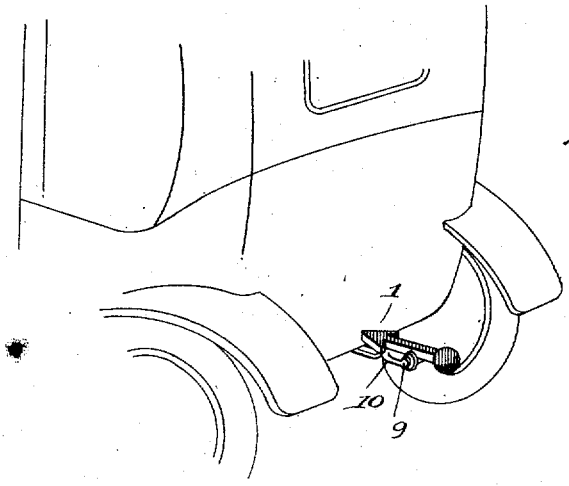
Figure 1 is a perspective view of the improved traffic signal shown in its applied relation to a motor vehicle.
Figure 8:
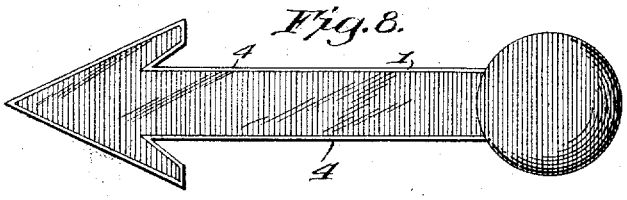
Fig. 8 is a plan view of the pointer or indicator.
Figure 9:
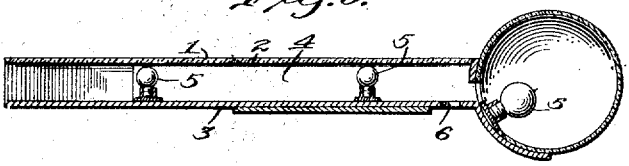
Fig. 9 is a longitudinal section through the same.
Figure 2:
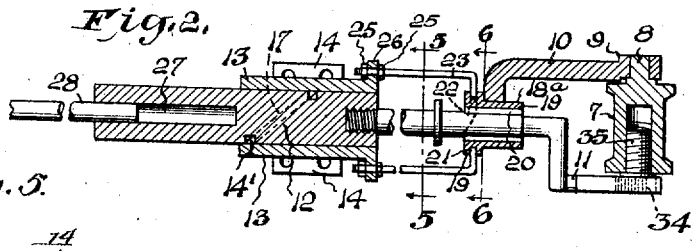
Fig. 2 is an enlarged longitudinal section through the indicator or traffic signal operating means.
Figure 5:
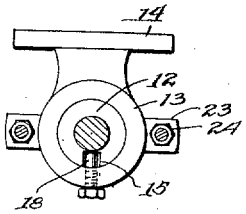
Fig. 5 is a section on the line 5—5 of Fig. 2.
Figure 6:
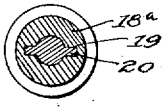
Fig. 6 is a section on the line 6—6 of Fig. 2.
Figure 7:
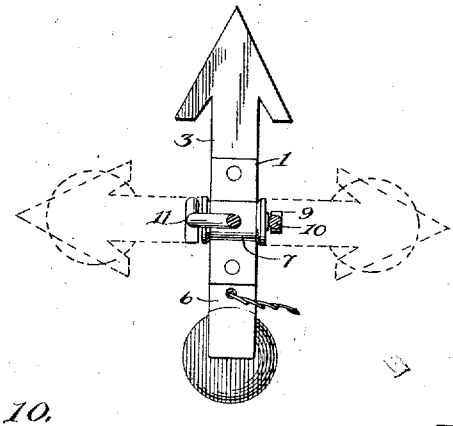
Fig. 7 is a rear elevation showing the vertical position of the pointer in full lines and the right and left hand positions thereof in dotted lines.
Figure 4:
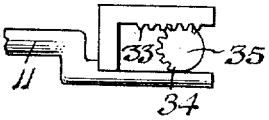
Fig. 4 is a fragmentary elevation of the rack and pinion transmission mechanism.

The traffic signal comprises a signaling arm or pointer 1 which is shown in the form of an arrow of hollow formation, comprising an upper wall 2, a lower wall 3, and side walls 4, the upper wall of the pointer being composed of glass or other translucent material so as to be visible after nightfall when interiorly illuminated by means of electric lamps or bulbs 5 which are disposed at intervals throughout the length of the burner and within the base or hub portion thereof as shown in the drawing, the wires leading to said lamps or bulbs passing through an opening 6 in the body of the arm or pointer as shown.

The pointer or arm 1 is mounted upon an oscillatory or partially rotatable support or hub 7 having a journal 8 which is mounted rotatably in a bearing 9 carried by an arm 10 supported in a manner hereinafter particularly described, the hub or support 7 being mounted between the arm 10 and another arm 11, the latter being employed for imparting a partial rotary or rocking movement to the support 7 as will hereinafter appear.

The arm 11 is connected integrally to or suitably fastened in fixed relation to a rotatable cam rod 12 which is journaled in a main supporting bearing 13, having an attaching base 14 by means of which it is fixedly secured to the vehicle. The cam rod 12 has a cam groove 14′ extending longitudinally thereof and comprising a straight longitudinal portion 15, an inclined portion 16 leading off therefrom, and a reversely inclined portion 17 of greater extent than the inclined portion 16. The cam groove 14′ is engaged by a pin 18 having a fixed connection with the stationary bearing 13, whereby as said cam rod is shifted longitudinally through the bearing 13, a partial rotative movement is imparted thereto first in one direction and then in the opposite direction. The longitudinal portion 15 of the cam groove permits the cam rod to be shifted longitudinally to a certain extent or degree without any turning movement of said cam rod.

The arm 10 is provided at its inner end with a sleeve 18ᵃ having one or more grooves 19 to receive a corresponding number of keys or ribs 20 on the arm 11 where it passes through said sleeve 18ᵃ. The sleeve 18ᵃ is provided with annular grooves 21 having spiral portions which open out at the inner end of the sleeve and working in the grooves 21 are the inturned end portions 22 of a pair of yokes or studs 23 which are adjustably secured by means of nuts 24 and 25 to oppositely extending lugs 26 on the fixed or stationary bearings 13. The members 23 thus serve to prevent any movement of the sleeve 18ᵃ longitudinally with respect to the axis of the bearing member 13 while the longitudinal portion 15 of the cam groove is moving along the pin 18. When, however, the pin 18 enters and moves along the inclined portions of the cam groove, the sleeve 18ᵃ is partially rotated until the members 23 pass out of engagement therewith and release the sleeve 18ᵃ.

Figure 10:
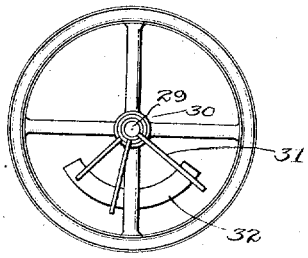
Fig. 10 is a plan view of the operating lever mounted on the head of the steering car.
Figure 11:
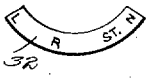
Fig. 11 is a plan view of the graduated sector.
Figure 3:
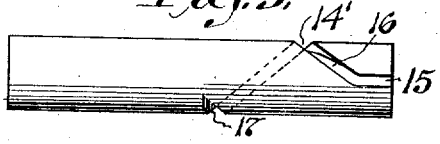
Fig. 3 is a plan view of the cam rod.

The cam rod 12 is formed with a bore 27 which receives an operating push rod 28 adjustable in the bore 27 to provide for properly adjusting the traffic operating mechanism in relation to the motor vehicle upon which it is mounted. The push rod 28 may be connected by any suitable means such as a lever or link to an operating shaft 29, see Fig. 10, extending upwardly through the steering column 30 of the machine and having secured to its upper end an operating lever 31 designed to sweep over an arcuate graduated plate or sector 32 having suitable emblems thereon to designate such direction as left, right, turn and stop as may be found desirable by the manufacturer. It will now be understood that by operating the lever 31, the push rod 28 is moved longitudinally thereby imparting a corresponding movement to the cam rod 12, causing the latter to slide through the bearing 13 and causing the cam groove of said rod to engage the fixed pin 18, thus imparting a partial rotary movement to the cam rod during the longitudinal movement thereof.

The operation of the device is as below, attention being invited particularly to sheet 4 of the drawings. The signal indicator 1 normally lies in a horizontal plane pointing directly forward in the direction of travel of the car as seen in Fig. 12. In the initial movement of the rotatable cam rod 12 towards the point of the indicator signal, the pin 18 enters and engages the straight portion 15 of the cam groove so that the rotatable cam rod 12 is not rotated but moves in the direction of the arrow carrying with it the rod 11, see Figs. 13 and 14. The cam 11 is provided with a rack face 33 which engages a gear face 34 mounted in a stud shaft 33 extending from the adjacent edge of the support 7. A partial rotative movement having been thus imparted to the support 7, the pointer or indicator signal is actuated thereby and moves through an area of 90 degrees, that is to say, from the horizontal position shown in Fig. 12 to the vertical position shown in Figs. 13 and 14; this completes the initial movement of the device. In the further rearward movement of the cam rod 12 the pin 18 engages the inclined portion 16 of the cam groove, imparting thereby a partially rotative movement to the arm 11 which moves the pointer 1 standing in a vertical plane through an arc 90 degrees to a horizontal position in a plane transverse to the direction of travel of the car. The cam rod 12 has moved beyond the casing 13, as seen in Fig. 15, and the yokes 23 have passed along the annular spiral grooves 21, out of engagement with the sleeve 18ᵃ, and the position of the respective parts is that shown in Fig. 15. In the further movement of the cam rod 12 in the same direction, the pin 18 engages the longer and reversely inclined portion 17 of the cam groove and the pointer is thereby moved through an arc of 180 degrees from its last point so that the point of the indicator occupies a horizontal position exactly oppositely disposed to the position recently occupied by it, as seen in Fig. 16. By returning the lever 31 to its initial position the movements heretofore described are reversed and the indicating signal is returned to its original position in a horizontal plane pointing in the direction of travel of the car.

In Fig. 1 of the drawing, I have illustrated the indicator arm or pointer as mounted and arranged to operate at the rear of the motor vehicle but it will of course be apparent that said signaling arm or pointer may be arranged at the front of the vehicle or in any other desired position, the main feature of the invention residing in the means for swinging said indicating arm or pointer in a plurality of vertical planes so that it may be disposed in several positions to indicate clearly and unmistakably the direction in which the vehicle is about to travel. This is a great assistance to the drivers of other vehicles especially those traveling in rear of the vehicle equipped with the signaling apparatus and the mechanism is also useful to traffic policemen and pedestrians as they serve to advise the traffic in general as to the intended movement of the vehicle. The motion transmitting means between the initial operating lever 21 and the push rod 28 may be varied in accordance with the type of vehicle in conjunction with which the traffic signal is to be used, for example electrical means may be employed and I therefore do not desire to be restricted to any particular form of operating connection for that purpose. It will also be apparent that the particular means for imparting a partial rotative movement to the support 7 may be varied without departing from the principle of the invention as other means than the rack and pinion mechanism shown and described may be resorted to. The traffic signal eliminates the necessity of the operator using the arm to signal the direction in which he is about to turn thereby leaving his arms and hands free to manipulate the control of the machine. The mechanism is not only simple but is strong and reliable involving no delicate parts liable to get out of order and therefore it is able to stand the strains of rough usage, especially adapted to all types of commercial cars whether used for pleasure or industrial use.

What I claim is:—

1. In a vehicle carried traffic signal, a signal supporting member, a direction indicating and pointing member having an articulated connection with said supporting member, adapting it to be swung in a vertical plane in line with the direction of movement of the vehicle and also in a vertical plane at substantially a right angle to the direction of movement of the vehicle, and means for swinging said direction indicating member in either of said vertical planes, the last named means comprising a rockable element by which said indicating member is carried, including a push rod geared to said rockable element, and means including a cam device for rocking said element on an axis substantially at a right angle to its major axis, and a manually operable element controlling both of the last named means.

2. In a vehicle carried traffic signal, a signal supporting member, a direction indicating and pointing member having an articulated connection with said supporting member adapting it to be swung in a vertical plane in line with the direction of movement of the vehicle and also from right to left in a vertical plane at substantially a right angle to the direction of movement of the vehicle, and means for swinging said direction indicating member in either of said vertical planes, the last named means comprising a rockable element by which said indicating member is carried, means for rocking said element on the major axis, an arm supporting one end of said element and adapted to turn the same end for end, and another arm adapted to turn said element on its major axis.

3. In a vehicle carried traffic signal, a signal supporting member, a direction indicating and pointing member having an articulated connection with said supporting member adapting it to be swung in a vertical plane in line with the direction of movement of the vehicle and also in a vertical plane at substantially a right angle to the direction of movement of the vehicle, and means for swinging said direction indicating member in either of said vertical planes, the last named means comprising a rockable element by which said indicating member is carried, means for rocking said element on the major axis, an arm supporting one end of said element and adapted to turn the same end for end, and another arm adapted to turn said element on its major axis, and a single manually operable element controlling both of said arms.

4. A signal device for vehicles comprising a support adapted to be secured upon a vehicle, a member slidable and rotatable through said support, an arm carried by said member and having rack teeth thereon, a bracket arm having slidable connection with said member, a pointer having a hub portion journaled in the free end of said bracket arm, and a pinion extending from said hub and meshing with said rack.

5. A vehicle carried signal comprising a support adapted to be secured upon a vehicle and having a bore, a rod slidable and rotatable within said bore and having a cam groove, a pin within the bore engaging within the groove, an arm secured to and projecting from one end of said rod and formed with rack teeth, a bracket arm having one end formed to slidably receive said arm and having spiral grooves, yokes projecting from said support and having angular ends engaging within said spiral grooves, a pointer having a hub member journaled at one end in the free end of said bracket arm, and a pinion at the other end of said hub portion meshing with said rack teeth.

6. In a vehicle carried signal, a direction signaling member, supporting means for said signaling member adapting it to be pointed successively horizontally in the direction of the movement of the vehicle, vertically upward and from such position to the right or left in a vertical plane as predetermined, and means for swinging said signaling member to said several positions.

7. In a vehicle carried traffic signal, a signal supporting member, a direction indicating signaling member having an articulated connection with said supporting member adapting it to be swung successively to a substantially horizontal plane so as to point in the direction of travel of the vehicle, to a vertical plane, and from such position to the right or left in a vertical plane transversely of the direction of the travel of the vehicle, and means for swinging said signaling member in the several directions stated.

8. In a vehicle carried traffic signal, a signal supporting member, a direction indicating and supporting member having an articulated connection with the supporting member adapting it to be swung from a horizontal plane successively in a vertical plane in line with the direction of movement of the vehicle and also in a vertical plane at substantially a right angle to the direction of movement of the vehicle and means for swinging said direction indicating member to either of said vertical planes.

9. In a vehicle carried traffic signal, a signal supporting member, a direction indicating and pointing member having an articulated connection with said supporting member adapting it to be successively swung from a horizontal plane to a vertical plane in line with the direction of movement of the vehicle and also in a vertical plane at substantially a right angle to the direction of movement of the vehicle, and means for swinging said direction indicating member in either of said vertical planes, the last named means comprising a rockable element by which said indicating means is carried, means for rocking said element on its major axis, and means for rocking said element on an axis substantially at a right angle to its major axis.

10. In a vehicle carried traffic signal, a signal operating member, a direction indicating and pointing member having an articulated connection with said supporting member adapting it to be swung successively from a horizontal plane to a vertical plane in line with the direction of movement of the vehicle and also in a vertical plane at substantially a right angle to the direction of movement of the vehicle, and means for swinging said direction indicating member in either of said vertical planes, the last named means comprising a rockable element by which said indicating member is carried, means for rocking said element on its major axis, and means for rocking said element on an axis substantially at a right angle to its major axis, and a single operable element controlling both of said last named means.

11. In a vehicle carried signal, a supporting member comprising a sleeve, a rod movable and rotatable in said sleeve and having a groove cam thereon, a pin in said supporting member to engage the groove cam, a collar supported by and keyed to rotate with said rod but to have a permissive axial movement with regard to the said rod, a bracket arm on said collar, a pivot on said bracket arm, a direction indicator carried on said pivot for movement in a plane parallel to the axis of the rod, a bifurcated extension on said rod, a rack on the inside of one of the bifurcations, a pinion on the direction indicator and carried between the bifurcations and in engagement with said rack, and guide yokes in said supporting member to engage said collar and rotate it during axial movement of the said rod.

12. In a vehicle carried signal, a supporting member with a pin thereon, a rod movable and rotatable in said supporting member with a groove cam thereon to engage with the pin of said supporting member, a collar carrying a pointer and keyed to the rod, whereby axial movement of the said rod raises the pointer, and rotational movement of the said rod as imparted by the said cam and pin rocks the pointer.

13. In a vehicle carried signal, a supporting member, a rod movable and rotatable in said supporting member, a pin on said supporting member a pointer articulated to said rod, a grooved collar on said rod to cooperate with a yoke on said supporting member to raise the said pointer to an indicating position, a cam on said rod to cooperate with a pin on said supporting member to rock the said pointer to another indicating position.

14. In a vehicle carried signal, a supporting member, a rod movable and rotatable in said supporting member, a pointer articulated to said rod, a pin on said supporting member, a cam on said rod cooperating with said pin to successively raise the pointer to an indicating position, and thereafter release the pointer and rock into a second indicating position, and then rock in to a third indicating position.

15. In a vehicle carried signal, a supporting member, a rod movable and rotatable in said supporting member, a pointer articulated to said rod, means actuated by the axial movement of the rod to raise the said pointer from the normal axial to an indicating position, and means actuated by the further axial movement of said rod to rock the said pointer at right angles to its former plane of movement to another indicating position.

16. In an automobile direction indicator, the combination with a hollow pointer, means in the rear end thereof to form a tail light for the car and a vertically disposed axis upon which said pointer is horizontally positioned so as to indicate the direction of travel of the vehicle, of means to cause the pointer successively to rise from the horizontal to a vertical position so as to attract the attention of the driver of the following car and to further move to the right or to the left in the vertical plane to indicate the intended movement of the car to the right or to the left.

17. In a vehicle carried traffic signal, a direction signaling member, supporting means for said signaling member adapting it to be pointed horizontally in the direction of the movement of the vehicle and means for swinging said direction signal from the horizontal to a vertical position followed by a further movement of said signal in a vertical plane through the arc of a circle for as much as 90 degrees in either direction from a perpendicular and return to its horizontal position.

In testimony whereof, I affix my signature.

R. L. ATWELL.